United States Patent
Cho et al.

(10) Patent No.: US 8,311,351 B2
(45) Date of Patent: Nov. 13, 2012

(54) APPARATUS AND METHOD FOR IMPROVING FRAME RATE USING MOTION TRAJECTORY

(75) Inventors: Yang Ho Cho, Hwaseong-si (KR); Ho Young Lee, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 903 days.

(21) Appl. No.: 12/407,942

(22) Filed: Mar. 20, 2009

(65) Prior Publication Data

US 2010/0104140 A1  Apr. 29, 2010

(30) Foreign Application Priority Data

Oct. 23, 2008  (KR) .......................... 10-2008-0103994

(51) Int. Cl.
*G06K 9/36* (2006.01)
(52) U.S. Cl. .......................... 382/236; 382/232; 382/238
(58) Field of Classification Search .................. 382/232, 382/233, 236, 238, 107; 348/452, 699, 416.1, 348/443, 448; 375/240.27, 240.12, E7.105
See application file for complete search history.

(56) References Cited

U.S. PATENT DOCUMENTS

| | | | | |
|---|---|---|---|---|
| 5,361,105 A | * | 11/1994 | Iu | 348/699 |
| 5,784,114 A | * | 7/1998 | Borer et al. | 348/452 |
| 6,466,624 B1 | * | 10/2002 | Fogg | 375/240.27 |

FOREIGN PATENT DOCUMENTS

| | | |
|---|---|---|
| KR | 10-0209793 | 4/1999 |
| KR | 2003-0011311 | 2/2003 |
| KR | 2003-0033851 | 5/2003 |
| KR | 2003-0044691 | 6/2003 |
| KR | 10-2004-0108046 | 12/2004 |
| KR | 10-2005-0081730 | 8/2005 |
| KR | 10-2007-0011563 | 1/2007 |
| WO | 02/067576 | 8/2002 |

* cited by examiner

*Primary Examiner* — Anh Hong Do
(74) *Attorney, Agent, or Firm* — Staas & Halsey LLP

(57) ABSTRACT

A frame rate improving apparatus and method use a motion trajectory. The frame rate improving apparatus determines forward feature point trajectory information through a feature point, and generates a new intermediate frame by performing backward motion estimation through the feature point trajectory information, thereby generating an interpolated image with high quality.

20 Claims, 9 Drawing Sheets

APPARATUS AND METHOD FOR IMPROVING FRAME RATE USING MOTION TRAJECTORY

CROSS-REFERENCE TO RELATED APPLICATIONS

This application claims the benefit of Korean Patent Application No. 10-2008-0103994, filed on Oct. 23, 2008, in the Korean Intellectual Property Office, the disclosure of which is incorporated herein by reference.

BACKGROUND

1. Field

Example embodiments relate to a method for improving a frame rate of an image, and more particularly, to a frame improving method that may effectively generate an intermediate frame using a motion trajectory according to a feature point in a frame.

2. Description of the Related Art

When an image with a low frame rate is replayed by a device with a high frame rate, motion between frames is abnormally perceived. Also, in the case of an image device using an LCD, deterioration of image quality occurs in a video clip having high-speed motion, caused by a limited response speed due to the physical limitations of the LCD.

Accordingly, a method that generates an intermediate frame between frames using a motion vector determined by estimating motion to improve a frame rate is required. However, in a conventional motion vector estimated in frame units, there is a low probability that the motion vector is accurately estimated in all frames due to limitations of a motion estimating algorithm, lack of used frame information, and lack of information for determining an accurate motion vector, and thus deterioration of the image quality may occur.

Therefore, a frame rate improving method for preventing deterioration of image quality from an image and for increasing confidence with respect to the motion information is required.

SUMMARY

Example embodiments may provide an apparatus for improving a frame rate using a motion trajectory, the apparatus including a feature point trajectory information determiner to determine forward feature point trajectory information by tracing a feature point of a frame, a motion estimator to perform a block-based backward motion estimation with respect to a current frame based on whether a feature point traced for each block of the current frame exists, and a frame generator to generate a new intermediate frame between the current frame and a previous frame using a motion vector determined according to the backward motion estimation.

In this example, the feature point trajectory information determiner may additionally extract a feature point when any one of a case when a scene is changed between frames, a case when a number of feature points, each having a trajectory being traced, is less than a predetermined number of feature points, and a case when a number of feature points being extracted from a predetermined area of divided areas constituting a frame is less than another predetermined number of feature points occurs.

Also, the example embodiments may include an occlusion area detector to detect an occlusion area between frames using a Sum of Absolute Differences (SAD) of a block and the forward feature point trajectory information when the feature point is traced forward with respect to the plurality of frames.

Also, the motion estimator performs a backward motion estimation for a current block using the feature point trajectory information of the feature point when the traced feature point exists in the current block for which the motion estimation is performed in the current frame.

Also, the motion estimator performs a backward motion estimation for a current block using a motion vector of a block adjacent to the current block when the traced feature point does not exist in the current block for which the motion estimation is performed in the current frame.

Example embodiments may also provide a method for improving a frame rate using a motion trajectory, the method including determining forward feature point trajectory information by tracing a feature point of a frame, performing a block-based backward motion estimation with respect to the current frame based on whether a feature point traced for each block of the current frame exists, and generating a new intermediate frame between a current frame and a previous frame using a motion vector determined according to the backward motion estimation.

Additional aspects, features, and/or advantages will be set forth in part in the description which follows and, in part, will be apparent from the description, or may be learned by practice of the disclosure.

BRIEF DESCRIPTION OF THE DRAWINGS

These and/or other aspects, features, and advantages will become apparent and more readily appreciated from the following description, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to the like elements throughout. Example embodiments are described below to explain the present disclosure by referring to the figures.

A frame rate improving method according to an example embodiment may be implemented by a frame rate improving apparatus.

Figure 1:
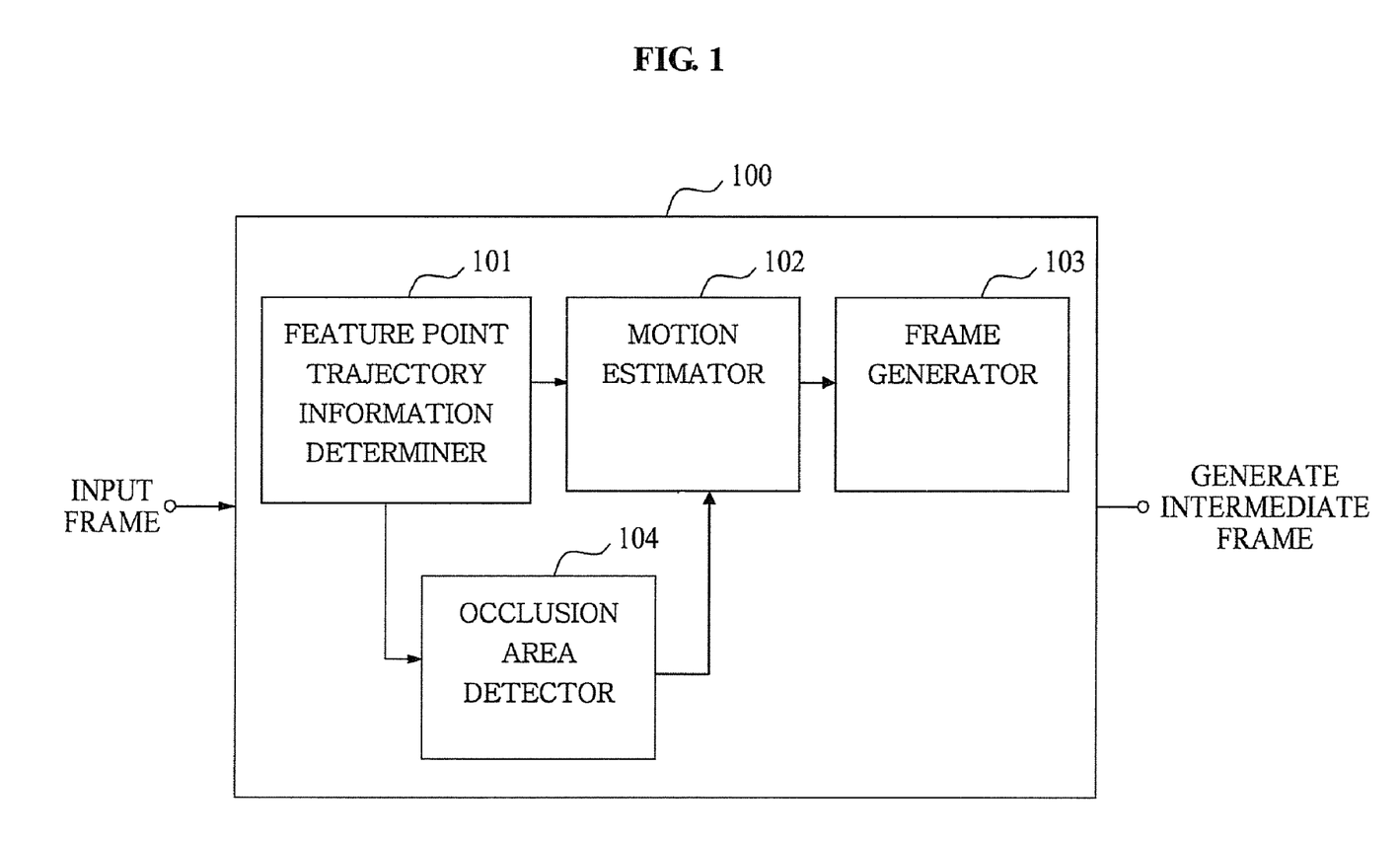
FIG. 1 is a block diagram illustrating a frame rate improving apparatus using a motion trajectory according to an example embodiment.

FIG. 1 is a block diagram illustrating a frame rate improving apparatus using a motion trajectory according to an example embodiment.

Referring to FIG. 1, the frame rate improving apparatus 100 includes a feature point trajectory information determiner 101, a motion estimator 102, a frame generator 103, and an occlusion area detector 104.

The feature point trajectory information determiner 101 may determine forward feature point trajectory information by tracing a feature point of a frame. As an example, the feature point trajectory information determiner 101 may successively trace a feature point extracted from an initial frame with respect to a plurality of forward frames and determine feature point trajectory information of the corresponding feature point. The initial frame may not indicate a first frame among frames constituting an image, but may indicate a frame where a feature point initially appears.

For example, the feature point trajectory information determiner 101 may extract a feature point from a frame 0, which is an initial frame, and may successively ascertain a location of a feature point for each frame 1, frame 2, and frame 3 appearing later. Then, the feature point trajectory information determiner 101 may determine feature trajectory information by connecting the ascertained feature points between frames. In detail, the feature point trajectory information is about a motion trajectory representing a direction in which a specific area including a feature point moves.

In this instance, the feature point may include a point which is extracted from a boundary, a corner, or a texture showing a high frequency feature within a local area of an image. Also, at least one feature point may exist in a frame.

When a predetermined circumstance occurs, the feature point trajectory information determiner 101 may additionally extract a feature point to maintain confidence with respect to the feature point trajectory information. Subsequently, the feature point trajectory information determiner 101 may determine feature point trajectory information with respect to the additionally extracted feature point.

As an example, when a scene is changed between frames, the feature point information determiner 101 may additionally extract a feature point with respect to a frame where the scene is changed. Subsequently, when a number of feature points, each having a trajectory being traced, is less than a predetermined number of feature points, the feature point trajectory information determiner 101 may additionally extract the feature point. Also, when a number of feature points being extracted from a predetermined area of divided areas constituting of a frame is less than another predetermined number of feature points, the feature point trajectory information determiner 101 may additionally extract the feature point.

Detailed examples of additional extracting of the feature point will be described with reference to FIG. 3 and FIG. 9.

The motion estimator 102 may perform a block-based backward motion estimation with respect to a current frame based on whether a feature point traced for each block of the current frame exists. In this instance, the current frame indicates a frame for which the motion is traced from among a plurality of frames constituting an image. The motion estimator 102 may estimate the motion based on a block as opposed to all pixels constituting the frame, considering an amount of operation and an efficiency of an algorithm.

As an example, when the traced feature point exists in a current block of the current frame, the motion estimator 102 may perform the backward motion estimation with respect to the current block using feature point trajectory information of the feature point. That is, the feature point trajectory information may be used for estimating a motion as a reference with high confidence.

Also, when the traced feature point does not exist in the current block of the current frame, the motion estimator 102 may perform the backward motion estimation with respect to the current block using a motion vector of a block adjacent to the current block. The motion estimator 102 may guarantee an accuracy of motion estimation by using the motion vector of the adjacent block having a high correlation with the current block.

A process of estimating the motion with respect to the current block will be described with reference to FIGS. 4A and 4B in detail.

The frame generator 103 may generate a new intermediate frame between the current frame and a previous frame using a motion vector determined according to the motion estimation. As a number of the intermediate frames increase, a frame rate may increase. As an example, the frame generator 103 may generate the intermediate frame by averaging blocks located in the previous frame and the current frame according to a direction of the motion vector.

The occlusion area detector 104 may detect an occlusion area between frames using a Sum of Absolute Differences (SAD) and forward feature point trajectory information when the feature point is traced forward with respect to the plurality of frames. In this instance, the SAD indicates a block matching error, and small SAD indicates small change in the motion of the block.

As an example, the occlusion area detector 104 may determine an area in which a feature point extracted from the previous frame is not extracted from the current frame and the SAD of the block is equal to or greater than a predetermined SAD as a covered area of the occlusion area. Also, the occlusion area detector 104 may determine an area in which a feature point that is not extracted from the previous frame is extracted from the current frame and the SAD of the block is equal to or greater than the predetermined SAD as an uncovered area of the occlusion area.

Therefore, the occlusion area detector 104 may determine an area where feature point trajectory information may not be determined since a corresponding feature point between the frames does not exist, as the occlusion area. A process of determining of the occlusion area will be described with reference to FIGS. 6A and 6B, FIGS. 7A and 7B.

Figure 2:
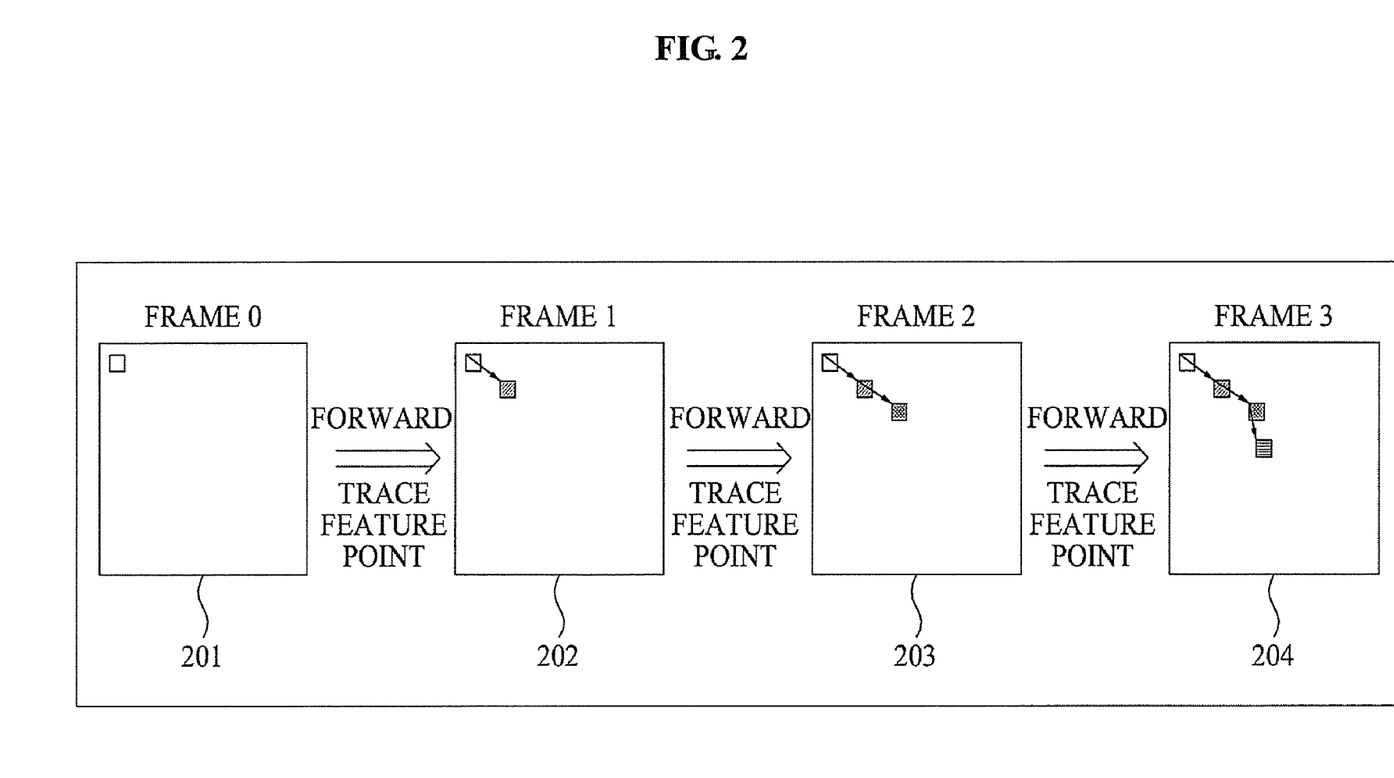
FIG. 2 illustrates an example of tracing a forward feature point with respect to a plurality of frames according to an example embodiment.

FIG. 2 illustrates an example of tracing a forward feature point with respect to a plurality of frames according to an example embodiment.

Referring to FIG. 2, four frames are illustrated, and an image sequentially includes a frame (0) 201, a frame (1) 202, a frame (2) 203, and a frame (3) 204.

As illustrated in FIG. 2, a feature point trajectory information determiner 101 may extract a feature point from the frame (0) 201. The frame (0) 201 indicates an initial frame. In this instance, at least one feature point may be extracted. That is, there is at least one feature point trajectory information with respect to the feature point. As an example, the feature point may include a point which is extracted from a boundary, a corner, or a texture showing a high frequency within a local area of the image.

The feature point trajectory information determiner 101 may determine the feature point trajectory information of the feature point by extracting a feature point from a temporally subsequent frame, a frame (1) 202, matched with the feature point extracted from the frame (0) 201. In the same manner, the feature point trajectory information determiner 101 may extract the same feature point from the frame (2) 203 and frame (3) 204, and successively connect the extracted feature point to determine feature point trajectory information.

In this instance, to guarantee confidence of the feature point trajectory information, the feature point trajectory information determiner 101 may determine the feature trajectory information based on a feature point successively traced with respect to at least three frames. A number of the frames may not be limited.

Therefore, according to an example embodiment, the feature point trajectory information determiner 101 may accurately estimate a motion vector based on tracing of a motion trajectory of a block with respect to the plurality of frames, compared with when estimating the motion vector based on tracing of the motion trajectory of the block with respect to two frames.

Figure 3:
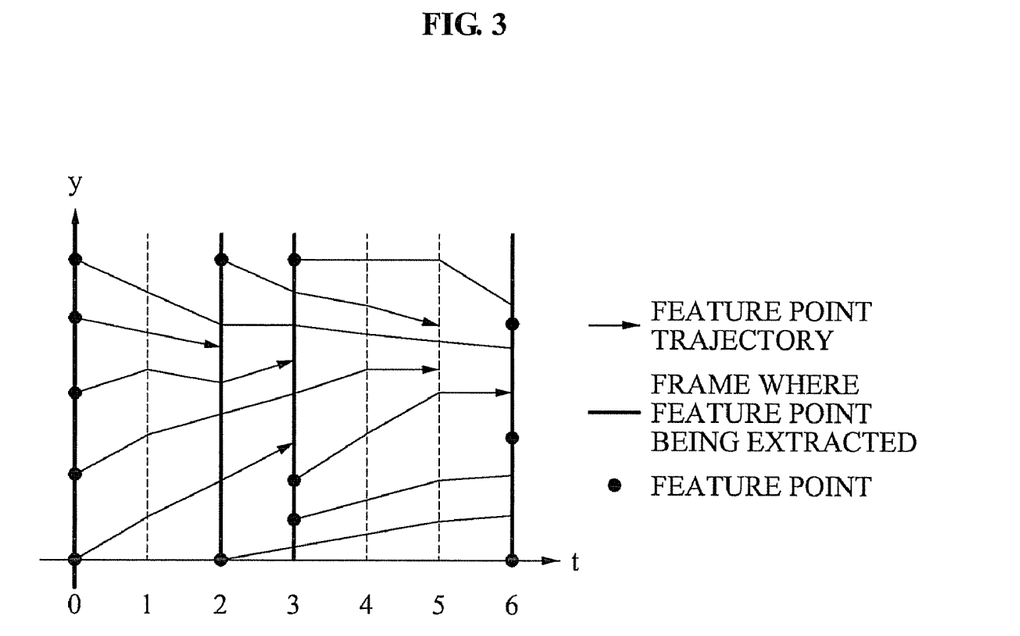
FIG. 3 illustrates an example of additionally extracting a feature point according to an example embodiment.

FIG. 3 illustrates an example of additionally extracting a feature point according to an example embodiment.

When a plurality of frames pass after extracting a feature point from a frame (0) 201, the initial frame illustrated in FIG. 2, feature points corresponding to the frames may not be extracted due to a change in a pixel brightness, a sudden motion, and an occlusion area, and thus feature point trajectory information may decrease. Also, the feature point extracted from the initial frame may need to be updated during trajectory tracing, due to a scene change between frames and a new object. Also, to generate an accurate intermediate frame, various feature point trajectory information of the feature point may be required.

As an example, the feature point trajectory information determiner 101 may additionally extract a feature point when any one of following cases occurs.

(1) When a scene is changed between frames:

In this instance, the scene change may be recognized when there is a change in a brightness distribution chart (histogram) of an image or when an SAD of a block excessively increases. When the scene is changed, a corresponding feature point between the frames may not exist, and thus, the feature point trajectory information determiner 101 may additionally extract an additional feature point.

(2) When a number of feature points, each having a trajectory being traced, is less than a predetermined number of feature points:

When the number of the estimated feature points is less than the predetermined number of feature points ($TH_1$), the feature point trajectory information determiner 101 may additionally extract an additional feature point to use feature point trajectory information with high confidence.

In a graph illustrated in FIG. 3, an X-axis indicates a temporal axis of an image (frame number) and Y-axis indicates spatial coordinates within a corresponding frame. When five feature points are extracted from the frame 0, the feature point trajectory information determiner 101 may trace five feature point trajectories for each frame. As illustrated in FIG. 3, when the number of the predetermined number of feature points ($TH_1$) is five and the number of the feature points traced in a frame (2) 203 is four, the additional feature point may need to be additionally extracted from the frame (2) 203.

(3) When a number of feature points extracted from a predetermined area of divided areas is less than a predetermined number of feature points ($TH_2$):

In the case that the frame consists of a plurality of the divided areas, when the number of the feature points extracted from the predetermined area of the divided areas is less than the predetermined number of feature points ($TH_2$), the feature point trajectory information determiner 101 may additionally extract an additional feature point to use feature point trajectory information with high confidence. That is, the feature point trajectory information may evenly exist in an entire area to perform accurate motion estimate and to cope with a new object.

As illustrated in FIG. 3, since a number of feature point trajectory information is one in a lower area of a frame (3) 204 when the predetermined number of feature points ($TH_2$) is two, the feature point trajectory information determiner 101 may additionally extract the additional feature point.

Figure 4A:
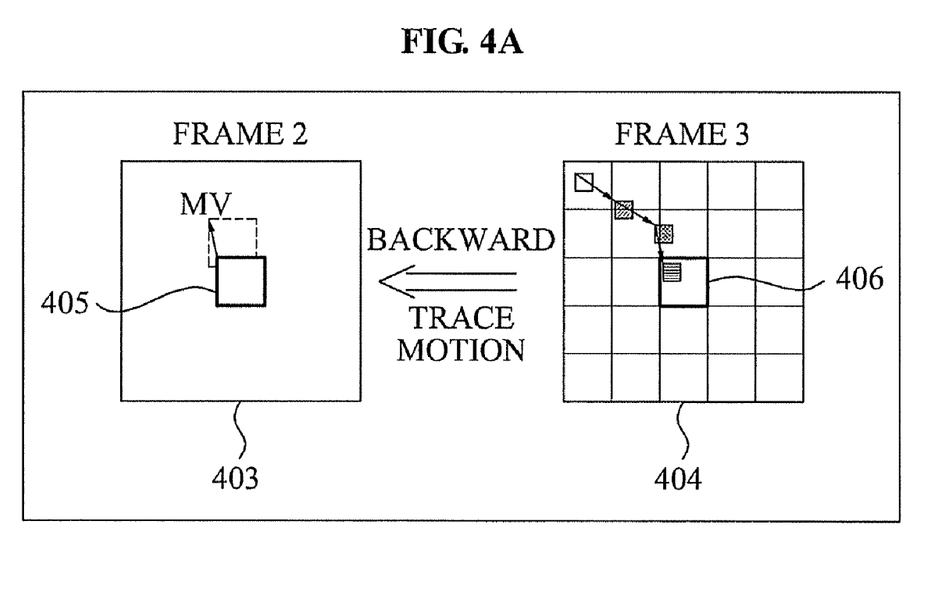
FIGS. 4A and 4B illustrate a process of determining of a motion vector of a current block by performing a backward motion estimation according to an example embodiment.
Figure 4B:
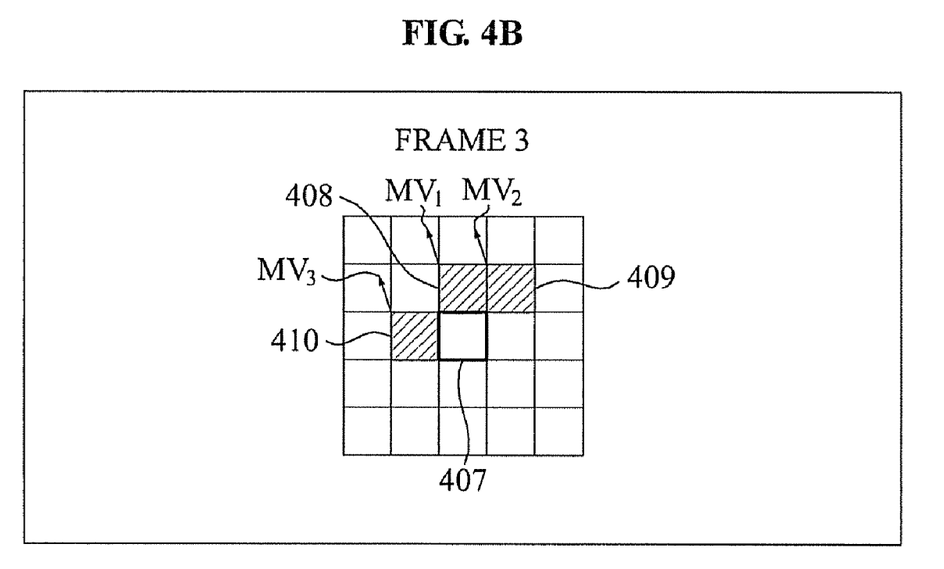

FIGS. 4A and 4B illustrate a process of determining of a motion vector of a current block by performing a backward motion estimation according to an example embodiment.

A motion estimator 102 may perform a block-based backward motion estimation with respect to the current frame based on whether a feature point is traced for each block of the current frame. In this instance, the current block indicates a block for which a motion vector is determined through motion estimation from among blocks included in the current frame. Also, an adjacent block indicates a block directly adjacent to the current block, the adjacent block already having a motion vector being determined through motion estimation.

As an example, the motion estimator 102 may perform the backward motion estimation with respect to the current block using feature point trajectory information of the feature point when the traced feature point exists in the current block of the current frame.

FIG. 4A illustrates a process of the performing of the backward motion estimation with respect to the current block using the feature point trajectory information.

Referring to FIG. 4A, a feature point exist in a block 406, the current block, of a frame (3) 404, the current frame. Subsequently, the motion estimator 102 may perform a backward motion estimation considering feature point trajectory information of the feature point. That is, the motion estimator 102 may determine a motion vector (MV) of the current block 406 using the feature point trajectory information, the information indicating trajectory information from a feature point corresponding to a frame (3) 404 to a feature point corresponding to a previous frame (2) 403. In other words, the motion estimator 102 may determine the motion vector as a vector from the current block 405 of the frame (2) 403 to a dotted line block to be corresponding to the feature point trajectory information.

When the traced feature point exists in the current block of the current frame, the motion estimator 102 may perform the backward motion estimation with respect to the current block using the motion vector of a block adjacent to the current block.

FIG. 4B illustrates a process of the performing of the backward motion estimation with respect to the current block using the motion vector of the adjacent block. The motion vector 102 may determine a motion vector with respect to a block 407, the current block, of a frame 3 402, the current frame, using motion vectors ($MV_1$, $MV_2$, $MV_3$) of adjacent blocks 408, 409, and 410 for each of which motion estimation is already performed. In this instance, the motion estimator 102 may determine a motion vector having a highest correlation with the current block from among the motion vectors of the adjacent blocks 408, 409, and 410 as the motion vector of the current block 407.

That is, when the feature point exists in the current block for which the motion vector is determined, the motion estimator 102 may determine the motion vector of the current block using feature trajectory information with high confidence, thereby improving an accuracy of the motion estimation. However, when the feature point does not exist in the current block, the motion estimator 102 may improve the accuracy of the motion estimation by determining the motion vector of the current block using the motion vector of the adjacent block having the high correlation with the current block.

Figure 5:
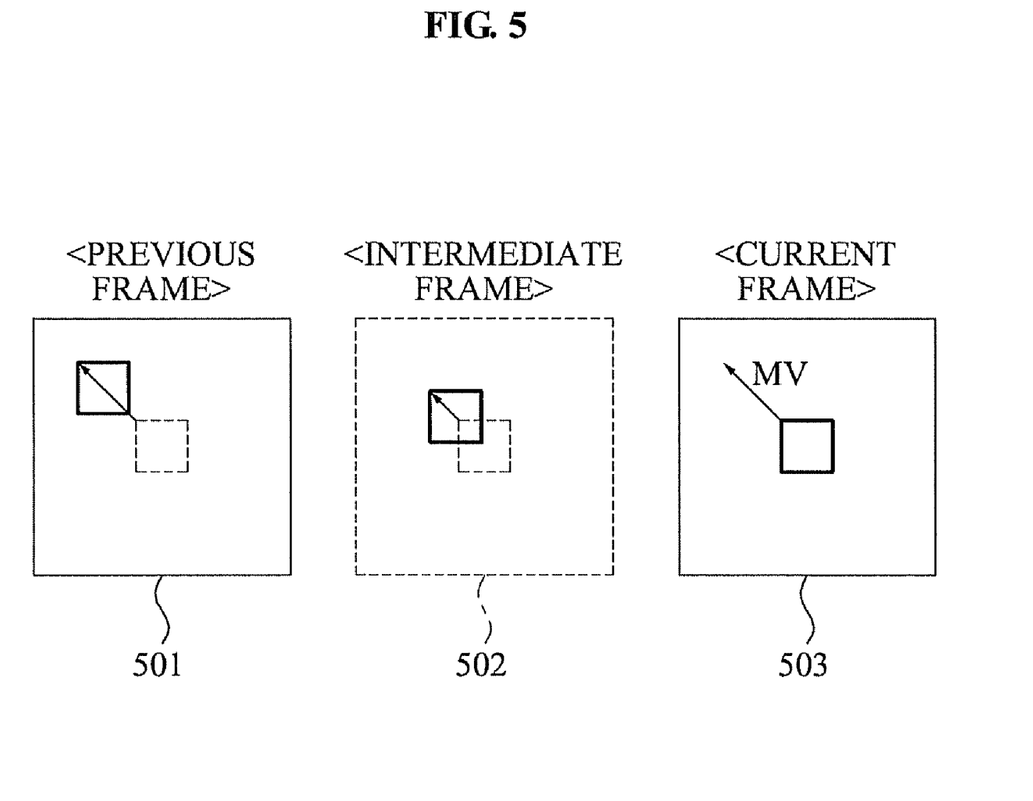
FIG. 5 illustrates a process of generating of an intermediate frame using a motion vector of a current block according to an example embodiment.

FIG. 5 illustrates a process of generating of an intermediate frame using a motion vector of a current block according to an example embodiment.

In this instance, a frame generator 103 may generate a new intermediate frame by interpolating between a previous frame 501 and a current frame 503. Referring to FIG. 5, when a motion vector (MV) with respect to a current block 505 of the current frame 503 is determined by tracing a motion, the frame generator 103 may generate the intermediate frame 502 by averaging blocks located between the previous frame 501 and the current frame 503 considering a direction of the motion vector. A process of generating of the intermediate frame 502 is performed with respect to all blocks included in the current frame 503.

As an example, when an occlusion area exists between the previous frame 501 and the current frame 503, the frame generator 103 may generate the intermediate frame 502 using one frame from among the previous frame 501 or the current frame 503 depending on a type of the occlusion area. Specifically, when the occlusion area is a covered area, the frame generator 103 may generate the intermediate frame 502 using the previous frame 501. Also, when the occlusion area is an uncovered area, the frame generator 103 may generate the intermediate frame 502 using the current frame 503.

A process of detecting the occlusion area and generating the intermediate frame with respect to the occlusion area will be described with reference to FIGS. 6A and. 6B and FIGS. 7A and 7B.

Figure 6A:
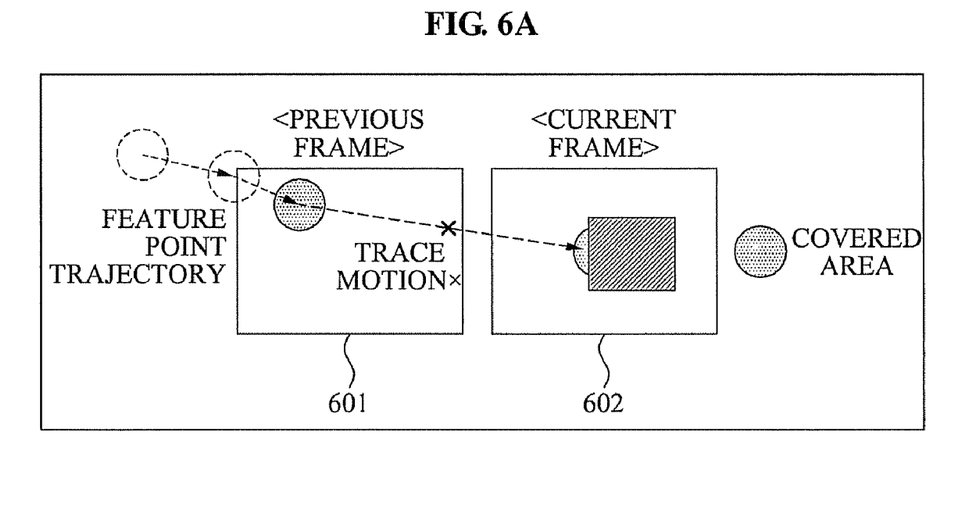
FIGS. 6A and 6B illustrates a process of detecting of a covered area of an occlusion area between frames according to an example embodiment.
Figure 6B:
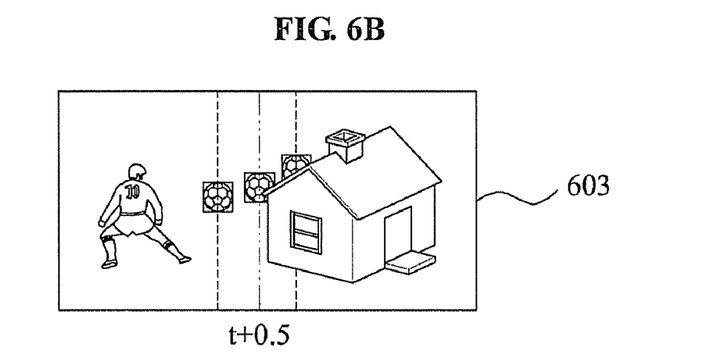

FIGS. 6A and 6B illustrates a process of detecting of a covered area of an occlusion area between frames according to an example embodiment.

An occlusion area detector 104 may detect an occlusion area between frames using an SAD of a block and the forward feature point trajectory information when a feature point is traced forward with respect to a plurality of frames. The occlusion area detector 104 may determine an area in which a feature point extracted from a previous frame is not extracted from a current frame and the SAD of the block is equal to or greater than a predetermined SAD as a covered area of the occlusion area. In the case of the occlusion area, generally, the SAD value may be great since corresponding points between frames do not exist.

Referring to FIG. 6A, a trajectory of a feature point is traced as a center of a "circle" existing in a previous frame 601. However, in a current frame 602, the feature point is no longer traced since the "circle" moves behind a "square". That is, the occlusion area exists between the previous frame 601 and the current frame 602. In this instance, the occlusion area detector 104 may determine the "circle" as the covered area of the occlusion area. For reference, the "square" may be determined as the uncovered area.

In this instance, since deterioration of image quality may occur when a frame with respect to an area determined as the covered area is generated using the previous frame and the current frame, the frame generator 103 may generate the frame with respect to the area determined as the covered area only referring to the previous frame.

That is, referring to a FIG. 6B, when a trajectory of a soccer ball appearing in a t frame corresponding to the previous frame 601, is not traced in a t+1 frame corresponding to the current frame 602, the occlusion area detector 104 may determine the soccer ball as the covered area. Subsequently, the frame generator 103 may generate the soccer ball in a t+0.5 frame corresponding to the intermediate frame, only referring to a motion vector of the soccer ball that appears in the t frame, the previous frame.

Figure 7A:
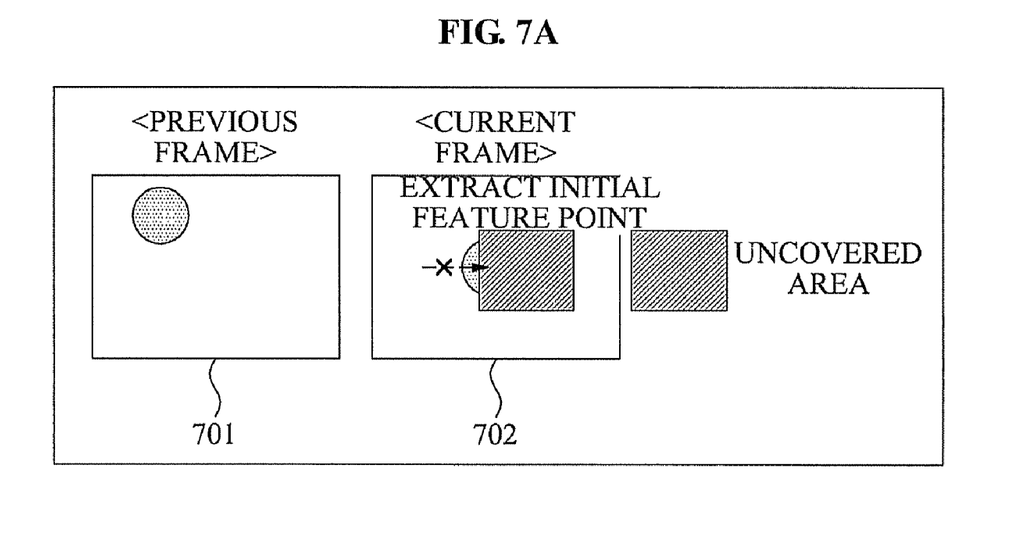
FIGS. 7A and 7B illustrate a process of detecting of an uncovered area of an occlusion area between frames according to an example embodiment.
Figure 7B:
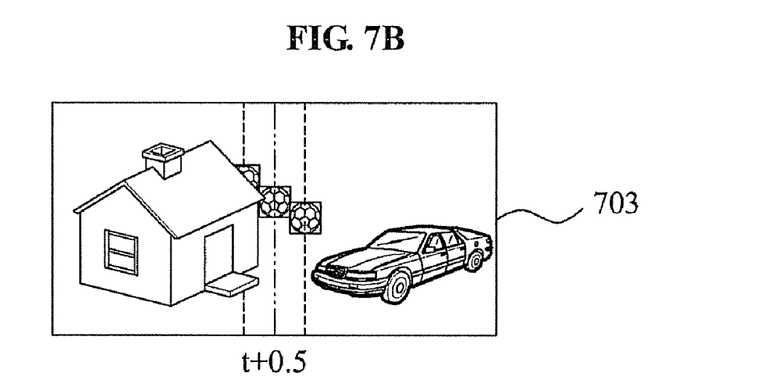

FIGS. 7A and 7B illustrate a process of detecting of an uncovered area of an occlusion area between frames according to an example embodiment An occlusion area detector 104 may determine an area in which a feature point that is not extracted from a previous frame is extracted from a current frame and the SAD of the block is equal to or greater than a predetermined SAD as an uncovered area of the occlusion area.

Referring to FIG. 7A, a "square" does not exist in a previous frame 701, however, appears in a current frame 702, and thus, a new feature point is extracted. That is, the current frame 702 where the "square" appears may be an initial frame where a feature point is extracted. That is, the occlusion area exists between the previous frame 701 and the current frame 702. In this instance, the occlusion area detector 104 may determine the "square" of the occlusion area as the uncovered area.

In this instance, since deterioration of image quality may occur when a frame with respect to an area determined as the uncovered area is generated using the previous frame and the current frame, the frame generator 103 may generate the frame with respect to the area determined as the uncovered area only referring to the current frame.

That is, referring to FIG. 7B, when a soccer ball that does not appear in a t frame corresponding to the previous frame 701, suddenly appears in a t+1 frame corresponding to the current frame 702, and a trajectory of the soccer ball is traced, the occlusion area detector 104 may determine the soccer ball as the uncovered area. Subsequently, the frame generator 103 may generate the soccer ball in a t+0.5 frame corresponding to the intermediate frame, only referring to a motion vector of the soccer ball that appears in the t+1 frame corresponding to the current frame 702.

Figure 8:
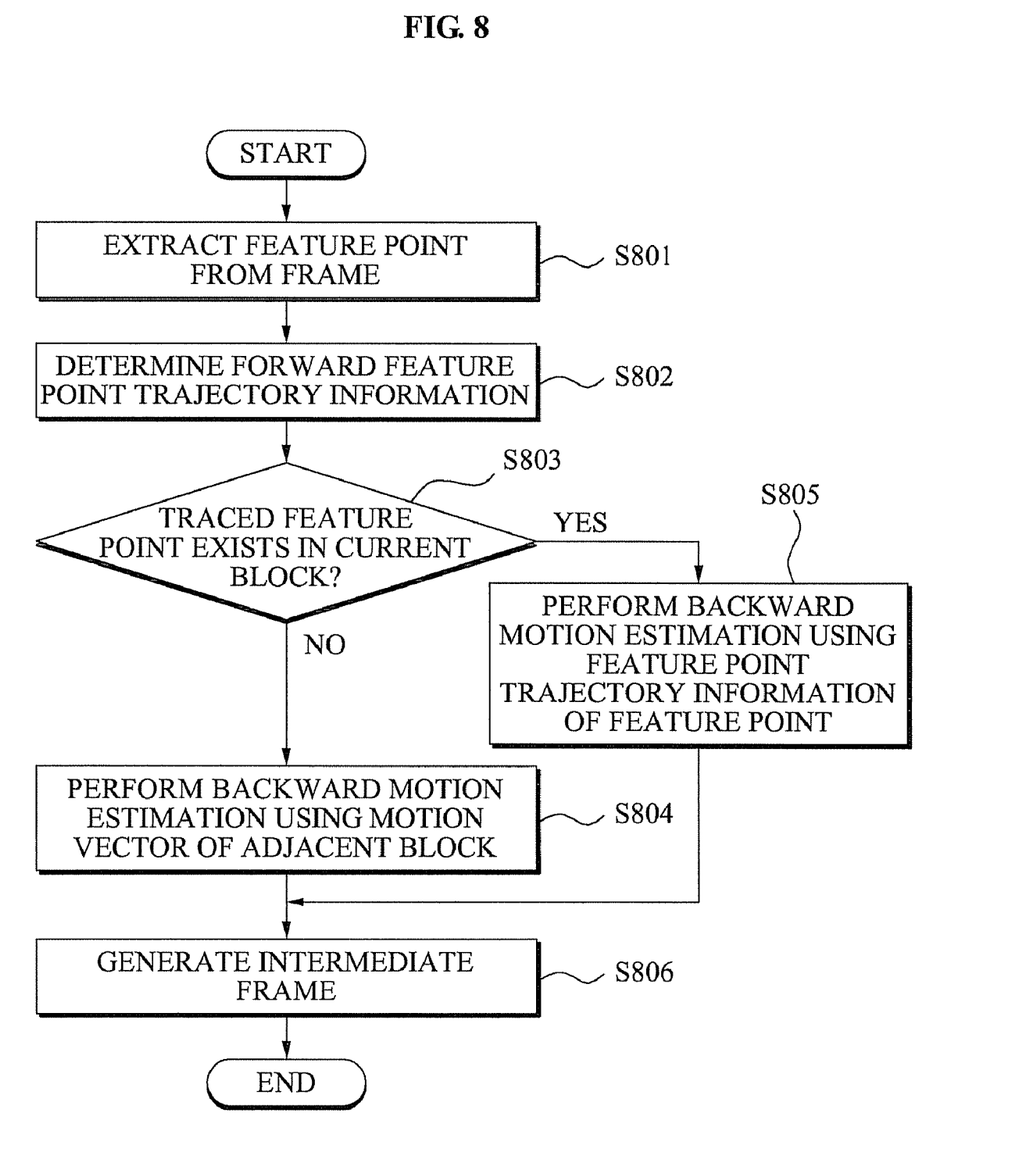
FIG. 8 is a flowchart illustrating a frame rate improving method using a motion trajectory according to an example embodiment.

FIG. 8 is a flowchart illustrating a frame rate improving method using a motion trajectory according to an example embodiment.

In operation S801, a frame rate improving apparatus may extract a feature point from an initial frame. In this instance, the feature point may include a point which is extracted from a boundary, a corner, or a texture showing high frequency within a local area of an image.

In operation S802, the frame rate improving apparatus may determine feature point trajectory information of the feature point by successively tracing the feature point extracted from the initial frame with respect to a plurality of forward frames. That is, the frame rate improving apparatus may determine forward feature point trajectory information by tracing a feature point of a frame.

As an example, when the successively traced trajectory of the feature point is discontinued in a specific frame, the frame rate improving apparatus may detect a corresponding area as a covered area of an occlusion area. Also, when a new feature point is determined due to a sudden appearance of a new object in the specific frame, the frame rate improving apparatus may detect an area including the determined feature point as an uncovered area of the occlusion area.

In operation S803, the frame rate improving apparatus may perform motion estimation based on a result of verifying whether the traced feature point exists in the present block. In this instance, the present block may indicate a block included in the present frame for which motion estimation is performed.

When the traced feature point does not exist in the present block, the frame rate improving apparatus may perform backward motion estimation with respect to the present block using a motion vector of a block adjacent to the present block in operation S804. In this instance, the adjacent block may indicate a block already having a motion vector being determined through motion estimation. Also, the backward motion estimation may indicate a motion vector with respect to the present block from the present frame to the previous frame.

When the traced feature point exists in the present block, the frame rate improving apparatus may perform backward motion estimation with respect to the present block using feature point trajectory information of the feature point in operation S805. That is, since the feature point trajectory information determined through a plurality of frames may indicate information with high confidence used for determining the motion vector of the present block, accuracy of the motion estimation may increase.

When the motion vector with respect to the present block is determined, the frame rate improving apparatus may generate a new intermediate frame between the present frame and the previous frame using the motion vector determined according to the motion estimation, In this instance, the frame rate improver may generate the intermediate frame with respect to the covered area of the occlusion area using the motion vector of the previous frame. Also, the frame rate improving apparatus may generate the intermediate frame with respect to the uncovered area of the occlusion area using the motion vector of the present frame.

Omitted descriptions related to FIG. 8 may be described with reference to FIGS. 1 to 7B.

Figure 9:
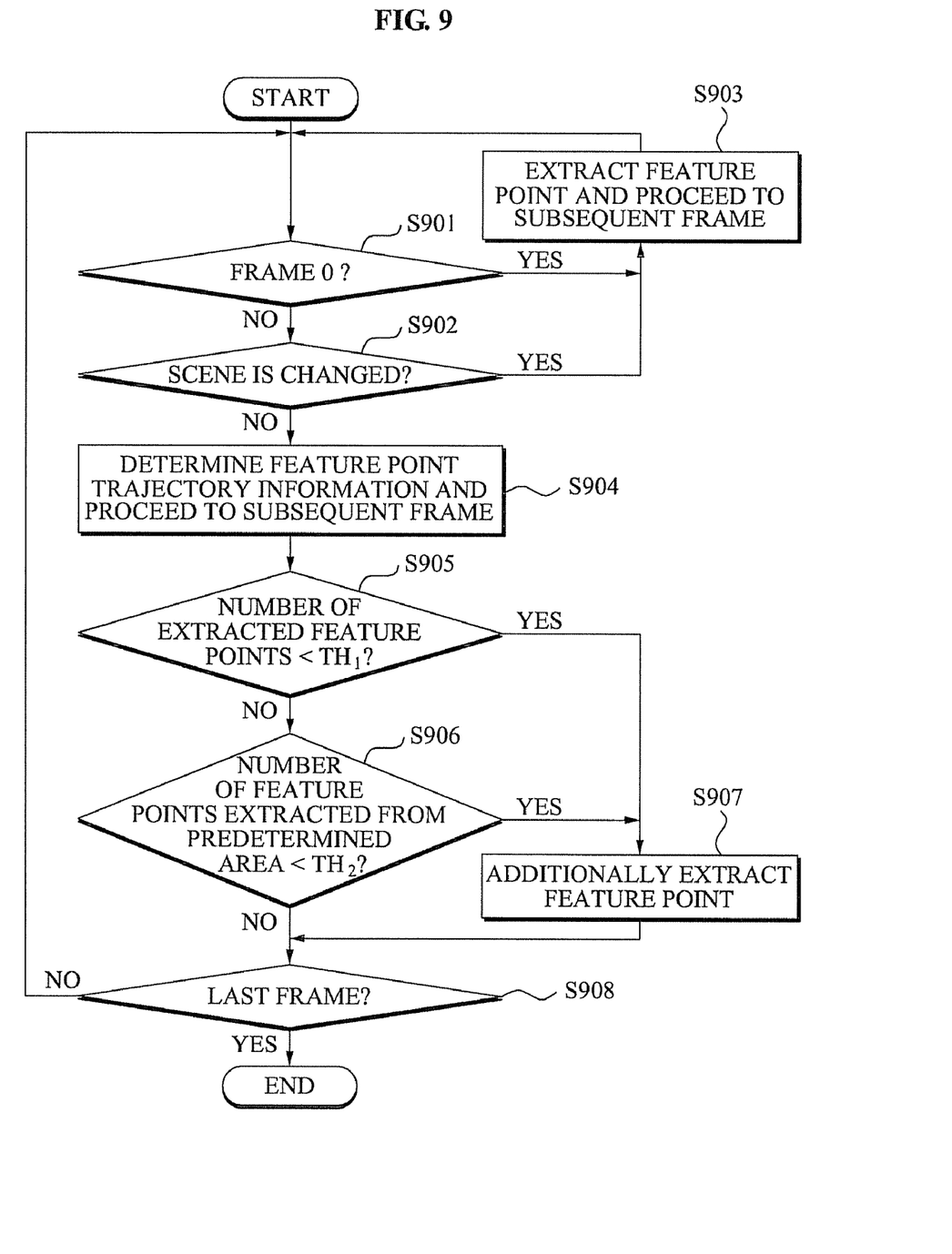
FIG. 9 is a flowchart illustrating a process of additionally extracting of a feature point according to an example embodiment.

FIG. 9 is a flowchart illustrating a process of additionally extracting a feature point according to an example embodiment.

The frame rate improving apparatus may extract a feature point from a feature point, and determine feature point trajectory information by successively tracing the feature point with respect to a plurality of forward frames. In this instance, the frame rate improving apparatus may additionally extract a feature point through a process illustrated in FIG. 9. The frame rate improving apparatus may determine feature point trajectory information by successively tracing the additionally extracted feature point with respect to the plurality of frames.

In operation S901, the frame rate improving apparatus may determine whether a frame where the feature point is extracted is an initial frame (frame (0)). When the frame where the feature point is extracted is the initial frame, the frame rate improving apparatus may extract the feature point and proceed to a subsequent frame in operation S903.

When the frame where the feature point is extracted is not the initial frame, the frame rate improving apparatus may determine whether a scene change between frames is sensed in operation S902. When the scene change is sensed, the frame rate improving apparatus may extract the feature point and proceed to a subsequent frame in operation S903.

Also, when the frame where the feature point is extracted is not the initial frame and also a scene change is not sensed, the frame rate improving apparatus may determine feature point trajectory information using an extracted feature point, and proceed to a subsequent frame in operation S904.

In operation S905, the frame rate improving apparatus may determine whether a number of feature points extracted from a specific frame is less than a predetermined number of feature points ($TH_1$). When the number of the extracted feature points is less than the predetermined number of feature points ($TH_1$), the frame rate improving apparatus may additionally extract a feature point in operation S907.

When the number of extracted feature points is equal to or greater than the predetermined number of the feature points ($TH_1$), the frame rate improving apparatus may determine whether a number of feature points extracted from a predetermined area is less than a predetermined number of feature points ($TH_2$). When the number of the feature points extracted from the predetermined area is less than the predetermined number of the feature points ($TH_2$), the frame rate improving apparatus may additionally extract a feature point in operation S907.

Also, when the number of feature points extracted from the predetermined area is equal to or greater than the predetermined number of the feature points ($TH_2$), the frame rate improving apparatus may determine whether the frame where the feature point is extracted is a last frame in operation S908. When the frame is the last frame, the frame rate improving apparatus may end the process of determining of the feature point trajectory information. Also, when the frame is not the last frame, the frame rate improving apparatus may determine the feature point trajectory information by extracting a feature point with respect to a frame from operation S901.

According to an example embodiment, there may be provided a frame rate improving apparatus and method that may successively trace a trajectory forward, and perform backward motion estimation through feature point trajectory information, thereby increasing an accuracy of motion estimation.

According to an example embodiment, there may be provided a frame rate improving apparatus and method that may perform backward motion estimation through a motion vector of an adjacent block having a high correlation with a present block when the feature point does not exist in the present block, thereby increasing an accuracy of motion estimation.

According to an example embodiment, there may be provided a frame rate improving apparatus and method that may additionally extract a feature point to use a feature point even with respect to entire area of frame, thereby increasing an accuracy of motion estimation.

According to an example embodiment, there may be provided a frame rate improving apparatus and method that may detect an occlusion area where a trajectory of the feature point is not traced and may use a different frame generating method according to a kind of the occlusion area, thereby preventing deterioration of image quality from a frame to be generated.

Also, the frame rate improving method according to the above-described example embodiments may be recorded in computer-readable media including program instructions to implement various operations embodied by a processor or a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An apparatus, including a processor, for improving a frame rate using a motion trajectory comprising:
   a feature point trajectory information determiner to determine forward feature point trajectory information by tracing a feature point of a frame;
   a motion estimator to perform a block-based backward motion estimation with respect to a current frame based on whether a feature point traced for each block of the current frame exists; and
   a frame generator to generate a new intermediate frame between the current frame and a previous frame using a motion vector determined according to the backward motion estimation.

2. The apparatus of claim 1, wherein the feature point trajectory information determiner successively traces a feature point extracted from an initial frame with respect to a plurality of forward frames and determines feature point trajectory information of the feature point.

3. The apparatus of claim 1, wherein the feature point includes a point which is extracted from a boundary, a corner, or a texture showing a high frequency feature within a local area of an image.

4. The apparatus of claim 1, wherein the feature point trajectory information determiner additionally extracts a feature point when any one of: a case when a scene is changed between frames, a case when a number of feature points, each having a trajectory being traced, is less than a predetermined number of feature points, and a case when a number of feature points being extracted from a predetermined area of divided areas constituting a frame is less than another predetermined number of feature points occurs.

5. The apparatus of claim 1, further comprising: an occlusion area detector to detect an occlusion area between frames using a Sum of Absolute Differences (SAD) of a block and the forward feature point trajectory information when the feature point is traced forward with respect to the plurality of frames.

6. The apparatus of claim 5, wherein the occlusion area detector:
   determines an area in which a feature point extracted from the previous frame is not extracted from the current frame and the SAD of the block is equal to or greater than a predetermined SAD as a covered area of the occlusion area, and
   determines an area in which a feature point that is not extracted from the previous frame is extracted from the current frame and the SAD of the block is equal to or greater than the predetermined SAD as an uncovered area of the occlusion area.

7. The apparatus of claim 1, wherein the motion estimator performs a backward motion estimation for a current block using the feature point trajectory information of the feature point when the traced feature point exists in the current block for which the motion estimation is performed in the current frame.

8. The apparatus of claim 1, wherein the motion estimator performs a backward motion estimation for a current block using a motion vector of a block adjacent to the current block when the traced feature point does not exist in the current block for which the motion estimation is performed in the current frame.

9. The apparatus of claim 1, wherein the frame generator generates the intermediate frame by averaging blocks located in the previous frame and current frame according to a direction of the motion vector.

10. The apparatus of claim 6, wherein the frame generator:
    generates the intermediate frame with respect to the covered area using a motion vector of the previous frame, and
    generates the intermediate frame with respect to the uncovered area using a motion vector of the current frame.

11. A method for improving a frame rate using a motion trajectory, the method comprising:
    determining, by a processor, forward feature point trajectory information by tracing a feature point of a frame;
    performing, by the processor, a block-based backward motion estimation with respect to the current frame based on whether a feature point traced for each block of the current frame exists; and
    generating, by the processor, a new intermediate frame between a current frame and a previous frame using a motion vector determined according to the backward motion estimation.

12. The method of claim 11, wherein the determining of the forward feature point trajectory information successively traces the feature point extracted from an initial frame with respect to a plurality of forward frames and determines feature point trajectory information of the feature point.

13. The method of claim 11, wherein the determining of the forward feature point trajectory information additionally extracts the feature point when any one of:
    a case when a scene is change between frames,
    a case when a number of feature points, each having a trajectory being traced, is less than a predetermined number of feature points, and
    a case when a number of feature points being extracted from a predetermined area of divided areas constituting a frame is less than another predetermined number of feature points occurs.

14. The method of claim 11, further comprising:
    detecting an occlusion area between frames using a Sum of Absolute Differences (SAD) of a block and the forward feature point trajectory information when the feature point is traced forward with respect to the plurality of frames.

15. The method of claim 14, wherein the detecting of the occlusion area between the frame comprises:
    determining an area in which a feature point extracted from the previous frame is not extracted from the current frame and the SAD of a block is equal to or greater than a predetermined SAD as a covered area of the occlusion area, and
    determining an area in which a feature point that is not extracted from the previous frame is extracted from the current frame and the SAD of the block is equal to or greater than the predetermined SAD as an uncovered area of the occlusion area.

16. The method of claim 11, wherein the performing of the block-based backward motion estimation performs a backward motion estimation for a current block using the feature point trajectory information of the feature point when the traced feature point exists in the current block for which the motion estimation is performed in the current frame.

17. The method of claim 11, wherein the performing of the block-based backward motion estimation performs a backward motion estimation for a current block using a motion vector of a block adjacent to the current block when the traced feature point does not exist in the current block for which the motion estimation is performed in the current frame.

18. The method of claim 11, wherein the generating of the intermediate frame generates the intermediate frame by averaging blocks located in the previous frame and current frame according to a direction of the motion vector.

19. The method of claim 15, wherein the generating of the intermediate frame:
  generates the intermediate frame with respect to the covered area using a motion vector of the previous frame, and
  generates the intermediate frame with respect to the uncovered area using a motion vector of the current frame.

20. At least one medium comprising computer readable instructions implementing the method of claim 11.

* * * * *